United States Patent [19]

Heimberg

[11] Patent Number: 4,522,998
[45] Date of Patent: Jun. 11, 1985

[54] INTERPOLYMER, PROCESS FOR ITS PREPARATION AND ADHESIVE OF IMPROVED CREEP RESISTANCE CONTAINING THE INTERPOLYMER

[75] Inventor: Manfred Heimberg, Cincinnati, Ohio

[73] Assignee: National Distillers and Chemical Corporation, New York, N.Y.

[21] Appl. No.: 562,555

[22] Filed: Dec. 19, 1983

[51] Int. Cl.$^3$ ............... C08F 32/04; C08F 232/04
[52] U.S. Cl. ................... 526/309; 524/553; 524/564; 524/832
[58] Field of Search ............. 526/309; 524/553, 564, 524/832

[56] References Cited

U.S. PATENT DOCUMENTS

| 3,716,504 | 2/1973 | Findemann et al. | 524/564 |
| 3,755,237 | 8/1973 | Isaacs et al. | 526/248 |
| 4,113,968 | 9/1978 | Mori et al. | 560/128 |

OTHER PUBLICATIONS

Chem. Abstracts, vol. 91, entry 91499n.
Mater Dokl. Nauchn. Sess Itvgam Nauchn-O-Issled. Rab. Pesp. Koordineruemym Akad. Nauk. Az. Ss Probl. Estestv. Obshihestv Nauk 1973 11th 1974, 41–43.

Primary Examiner—Joseph L. Schofer
Assistant Examiner—Peter F. Kulkosky
Attorney, Agent, or Firm—Kenneth D. Tremain

[57] ABSTRACT

Interpolymers are provided which are based upon the interpolymerization of a vinyl ester, a lower alpha olefin, optionally an alpha, beta ethylenically unsaturated carboxylic acid and a vinylcyclopropanedicarboxylate polyester oligomer or mixtures thereof. The interpolymers are particularly useful for formulating latex adhesives where they have been found to significantly improve the creep resistance properties thereof.

38 Claims, No Drawings

INTERPOLYMER, PROCESS FOR ITS PREPARATION AND ADHESIVE OF IMPROVED CREEP RESISTANCE CONTAINING THE INTERPOLYMER

BACKGROUND OF THE INVENTION

The present invention relates to the field of synthetic resins and, more particularly, to interpolymer latexes derived from ethylenically unsaturated monomers and to latex adhesive compositions containing the interpolymers Vinyl acetate-ethylene (VAE) copolymer latexes have found considerable application as bases for paints and other surface coatings, in adhesives, textile treating agents, and the like. A large body of technology has developed over the years both in respect to processes for preparing these commercially important latexes and to their end uses. For example, U.S. Pat. No. 4,267,090 describes polymerization procedures for preparing VAE latexes having an inherent viscosity of not less than 1.90 and demonstrating superior performance in the Time of Set Test and Vinyl Wetting Test, as defined therein.

SUMMARY OF THE INVENTION

In accordance with the present invention, interpolymer latexes are provided which are derived from the interpolymerization of (a) vinyl ester, (b) a lower alpha olefin, (c) optionally an alpha, beta ethylenically unsaturated carboxylic acid and (d) vinylcyclopropanedicarboxylate polyester oligomer of the general formula:

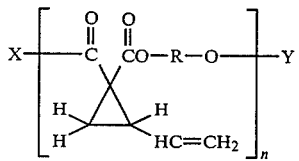

wherein R is a divalent radical derived from a $C_{2-12}$ aliphatic diol, a $C_{3-12}$ cycloaliphatic diol, a $C_{8-20}$ aromatic diol or an ether diol having from 4 to about 60 carbon atoms and 1 to about 30 ether moieties, n is an integer of from 1 to about 20 and X and Y are terminating groups.

When employed as the polymer component in latex adhesive formulations, the interpolymers of this invention significantly improve various properties thereof; in particular adhesives obtained from latexes containing these interpolymer exhibit enhanced creep resistance as compared to adhesives obtained from other vinyl acetate-ethylene copolymers prepared under the same conditions, but in the absence of the oligomers of the present invention.

Adhesives prepared from the interpolymers according to this invention also show a creep resistance equivalent to the creep resistance of adhesives made from Airflex 400 (Air Products and Chemical, Inc.). Airflex 400 is a vinyl acetateethylene copolymer latex of composition similar to the interpolymers of the present invention, but without the polyester oligomer used in these latex adhesives. It is also observed that the adhesives made from the present interpolymers are equivalent, and in some cases superior, to adhesives made from Airflex 400 in time of set and water sensitivity.

DESCRIPTION OF THE PREFERRED EMBODIMENTS

The vinyl ester monomeric component herein can be considered to be derived from the theoretical ethylenically unsaturated alcohol, vinyl alcohol, and any of the saturated monocarboxylic acids, e.g., formic acid, acetic acid, trimethylacetic acid, propionic acid, butyric acid, isobutyric acid, pentanoic acid, hexanoic acid, 2-ethylhexanoic acid, lauric acid, myristic acid and stearic acid and trifluoroacetic acid. A preferred vinyl ester for use herein is vinyl acetate.

It is, of course, within the scope of this invention to use a mixture of one or more of the foregoing vinyl esters.

The second monomer incorporated into the interpolymers of this invention is a lower alpha olefin, preferably ethylene.

An optional monomer incorporated into the interpolymers of this invention can be selected from the group consisting of alpha, beta ethylenically unsaturated carboxylic acids. Examples are acrylic acid, methacrylic acid, crotonic acid, ethacrylic acid, maleic acid, fumaric acid, itaconic acid, and the like. Of the alpha, beta ethylenically unsaturated acids, acrylic acid and methacrylic acid are preferred.

The vinylcyclopropanedicarboxylate polyester oligomer component of this invention can be represented by the general formula:

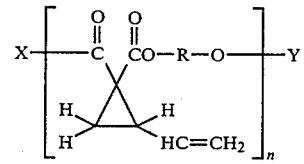

where R represents a divalent aliphatic, cycloaliphatic or aromatic radical or radical derived from an ether diol, n is an integer from 1 up to about 20 and X and Y represent terminating groups. The polyester will generally be used as a mixture of oligomers in which n will range from 1 up to about 10 with the predominant products having a value for n ranging from about 1 to about 5. The terminal group X can be hydroxy, alkoxy (most generally containing from 1 to 4 carbon atoms) or the group -OROH where R is the same as defined above. The terminal group Y can be hydrogen or the radical

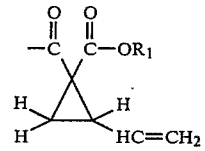

wherein $R_1$ is hydrogen or a $C_{1-4}$ alkyl group. These products are highly reactive under a variety of conditions, due at least in part to the fact that in addition to the reactivity of the vinyl group, the cyclopropane ring can also undergo ring opening thereby providing another site of chemical reactivity.

The aforedescribed vinylcyclopropanedicarboxylate polyester oligomer can be obtained by the reaction of 1-vinylcyclopropane-2,2-dicarboxylic acid or lower alkyl ester thereof with a diol. The vinylcyclopropanedicarboxylic acid or ester can be obtained by any of the known reaction procedures for condensing a 1,4-dihalobutene-2 with malonic esters. For example, the condensation can be accomplished by the classical method, i.e., by reacting the dihalide with the disodio anion of the malonic ester under anhydrous conditions, or using a "phase transfer" process wherein the dihalide is reacted with malonic ester in the presence of an -onium compound, an alkali metal compound and water.

The vinylcyclopropanedicarboxylic acid can be reacted (condensed) directly with the diol to produce the oligomers herein or, as is more commonly the case, the corresponding lower alkyl ester of vinylcyclopropanedicarboxylic acid will be reacted with the diol. Such transalcoholysis reactions are well known to the art and are readily adaptable and advantageous for the preparation of the vinylcyclopropanedicarboxylate polyester oligomer herein. The compounds can also be obtained by ester interchange. Therefore, it is intended and will be understood by those skilled in the art that wherever the vinylcyclopropanedicarboxylic acid is employed, the corresponding lower alkyl esters can also be used. Generally, $C_{1-4}$ alkyl esters, and particularly methyl and ethyl esters, of the 1-vinylcyclopropane-2,2-dicarboxylic acid are employed for transalcoholysis and ester-interchange procedures.

Useful diols for the preparation of the novel oligomer products include branched and straight-chain aliphatic diols, cycloaliphatic diols, aromatic diols and ether diols. As used herein, the term ether diols is intended to encompass condensation products of the aliphatic, cycloaliphatic or aromatic diols, ethoxylated and propoxylated aliphatic, cycloaliphatic or aromatic diols, and ethoxylated or propoxylated derivatives obtained from aliphatic, cycloaliphatic or aromatic polycarboxylic acids.

Aliphatic diols will contain from 2 to about 12 and, more preferably, 2 to about 8 carbon atoms. Cycloaliphatic diols having 3 to about 12, and more usually 5 to about 10, carbon atoms can be used. Useful aromatic diols can contain from about 8 up to about 20 carbon atoms and will correspond to the general formula:

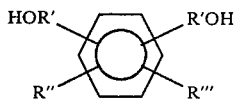

where R' represents a bivalent hydrocarbon radical of 1 to about 6 carbon atoms and R" and R''' are independently, hydrogen, a $C_{1-4}$ alkyl group or $C_{1-4}$ alkoxy group.

The ether diols can be derived from the abovedescribed or other aliphatic, cycloaliphatic and aromatic diols. Useful ether diols can contain from 4 up to about 60 carbon atoms and have from 1 to about 30 and, more usually, from 1 to about 20, ether linkages within the molecule. Most generally, these products are obtained from the ethoxylation or propoxylation of the diol, however, other diols or polyols can also be employed to obtain highly useful vinylcyclopropane-2,2-dicarboxylate polyester oligomers.

Illustrative diols of the above types include: ethylene glycol, 1,2- or 1,3-propylene glycol, 1,2-, 1,3-or 1,4-butanediol, 1,5-pentanediol, 3-methyl-1,5-pentanediol, 2,3-dimethyl-1,4-butanediol, 2,3-dimethyl-2,3-butanediol, 1,6-hexanediol-1,8-octanediol, 2-ethyl-1,6-hexanediol, 1,9-nonanediol, 1,10-decanediol, 1,3-cyclopentanediol, 1,2-, 1,3-or 1,4-cyclohexanedimethanol, 4-methyl-1,2-cyclohexanedimethanol, 1,5-cyclooctanediol, 1,2-, 1,3- or 1,4-benzenedimethanol, 2-nitro-p-xylene-alpha, alpha'diol, 5-nitro-m-xylenediol, 4-hydroxy-3-methoxyphenethyl alcohol, and the like.

Ether diols which can be used include such compounds as diethylene glycol, dipropylene glycol, triethylene glycol, tetraethylene glycol and higher polyoxyethylene or polyoxypropylene glycols having molecular weights ranging up to about 600. Mixtures of diols of the above types can also be used for the preparation of the polyester oligomers. Ethoxylated and propoxylated polyhydroxylated aromatics such as resorcinol, catechol, hydroquinone and bisphenols are also used to obtain useful oligomeric polyester products. Similarly, the reaction products of ethylene oxide or propylene oxide and aliphatic, cycloaliphatic and aromatic polycarboxlic acids are useful polyols for the preparation of the novel oligomers. Bis(hydroxyethyl)adipate, bis(hydroxyethyl)azelate, bis(hydroxyethyl)dimerate, bis(hydroxyethyl)terephthalate and higher ethoxylates or propoxylates are illustrative of such useful ether diols and polyols.

Substantial amounts of higher polyols may also be present with the diol. Highly complex molecules are possible when higher polyols are present in substantial amounts or constitute the entire alcohol portion, however, such products can find utility in some applications. Suitable polyols for this purpose include trimethylolpropane, glycerol, pentaerythritol, dipentaerythritol, tripentaerythritol, mannitol, sorbitol, and the like.

Polyester oligomers are obtained by reacting diols of the foregoing types with vinylcyclopropanedicarboxylic acid or ester thereof. Typically, however, the resulting products are a mixture of oligomeric polyester compounds in varying amounts, the composition of which is primarily determined by the molar proportions of reactants used for the reaction, the particular diol used and reaction conditions. While a large equivalents excess of either reactant may be utilized for the preparation of these products, most generally the diol and dicarboxylic acid or ester thereof are reacted at equivalents ratios from about 2:1 to 1:2 and, more preferably, the equivalents ratio of diol:vinylcyclopropanedicarboxylic acid or ester thereof will range from about 1.3:1 to 1:1.3. When operating within the above-defined equivalents ratios, the resulting products are typically transparent liquids — ranging from extremely fluid materials to highly viscous (amorphous) masses. The oligomeric products have average molecular weights from about 200 to 15,000 and, more usually, from 300 to 6,000. They are further characterized as having viscosities (24° C.) from about 0.2 to 200 poise and, more preferably, 0.3 to 150 poise.

As pointed out above, the predominant compound(s) present in the mixtures of this invention will be governed to some extent by the molar proportions of the reactants used. For example, if a large equivalents excess of the diol or ether diol is employed, a substantial amount of the product

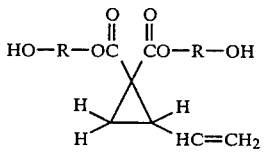

where R is the same as defined above can be present. On the other hand if a large equivalents excess of the vinylcyclopropanedicarboxylic acid or ester is used, a substantial portion of the product will consist of

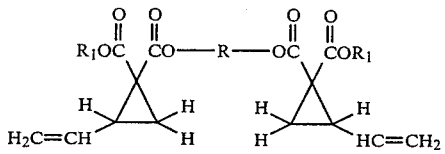

where R and R₁ are the same as previously defined For the above compounds, as with the other oligomeric products herein, it should be noted that various stereo isomers can also exist. While for reasons of economy and convenience, admixtures of the oligomer will ordinarily be used in the preparation of the interpolymers of this invention, it is possible to separate the various components present in the mixtures and thus to use only one or just a few of the isolated products. Separation can be accomplished employing known and conventional techniques, e.g., on an analytical scale employing chromatographic techniques and, in some instances, recovering or enriching lower molecular weight fractions in a desired component by distillation.

The quantities of vinyl ester, ethylene, alpha, beta ethylenically unsaturated carboxylic acid monomer if used, and vinylcyclopropanedicarboxylate polyester oligomer which are interpolymerized to provide interpolymers herein can vary over fairly wide limits. Thus, for example, from about 40 to about 95 parts by weight of vinyl ester, from about 5 to about 60 parts by weight of ethylene, from about 0.5 to 5.0 parts by weight of alpha, beta ethylenically unsaturated carboxylic acid, if used, and from about 0.1 to about 1 part by weight of vinylcyclopropanedicarboxylate polyester oligomer can be used herein with good results.

It is also within the scope of this invention to include minor amounts, e.g., up to about 10 weight parts, of one or more additional monomers which are capable of undergoing interpolymerization with the aforesaid components. Illustrative of such additional monomers are the following: carbon monoxide, sulfur dioxide, propylene, 1-butene, 2-butene, isobutylene, 1-pentene, 2-methyl-2-butene, 1-hexene, 4-methyl-1-pentene, 3,3-dimethyl-1-butene, 2,4,4-trimethyl-1-pentene, 1-heptene, 1-octene, 1-decene, 1-dodecene, allene, butadiene, isoprene, chloroprene, 1,5-hexadiene, 1,2,5-hexatriene, divinylacetylene, cyclopentadiene, dicyclopentadiene, norbornene, norbornadiene, methylnorbornene, cyclohexene, stryrene, alpha-chlorostyrene, alpha-methylstyrene, allylbenzene, phenylacetylene, 1-phenyl-1, 3-butadiene, vinylnaphthalene, 4-methylstyrene, 2,4-dimethylstyrene, 3-ethylstyrene, 2,5-diethylstyrene, 2-methoxystyrene, 4-methoxy-3-methylstyrene, 4-chlorostyrene, 3,4-dimethyl-alpha-methylstyrene, 3-bromo-4-methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinylbenzyl alcohol, 3-hydroxystyrene, 2,4-dihydroxystyrene, 3-nitrostyrene, 2-aminostyrene, 4-(N,N-dimethylamino)styrene, 4-phenylstyrene, 4-chloro-1-vinylnaphthalene, acrolein, methacrolein, acrylonitrile, methacrylonitrile, acrylamide, N-methacrylamide, N,N-dimethylacrylamide, chloroacrylic acid, methyl chloroacrylic acid, chloroacrylonitrile, ethacrylonitrile, N-phenylacrylamide, N,N-diethylacrylamide, N-cyclohexyl acrylamide, vinyl chloride, vinylidene chloride, vinylidene cyanide, vinyl fluoride, vinylidene fluoride, trichloroethene, methyl vinyl ketone, methyl isopropyl ketone, phenyl vinyl ketone, methyl alpha-chlorovinyl ketone, ethyl vinyl ketone, divinyl ketone, hydroxymethyl vinyl ketone, chloromethyl vinyl ketone, allylidene diacetate, methyl vinyl ether, isopropyl vinyl ether, butyl vinyl ether, 2-ethylhexyl vinyl ether, 2-methoxyethyl vinyl ether, 2-chloroethyl vinyl ether, methoxyethoxyethyl vinyl ether, hydroxyethyl vinyl ether, aminoethyl vinyl ether, isopropenyl methyl ether, divinyl ether, divinyl ether of ethylene glycol, divinyl ether of diethylene glycol, divinyl ether of triethanolamine, cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di-(ethylhexyl) maleate, maleic anhydride, dimethyl fumarate, vinyl ethyl sulfide, divinyl sulfide, vinyltolyl sulfide, divinyl sulfone, vinyl ethyl sulfone, vinyl ethyl sulfoxide, vinyl sulfonic acid, sodium vinyl sulfonate, vinyl sulfonamide, vinylbenzamide, vinylpyridine, N-vinylpyrrolidone, N-vinylcarbazole, N-(vinylbenzyl)pyrrolidine, N-(vinylbenzylpyrroline), N-(vinylbenzyl)piperidine, 1-vinylpyrene, 2-isopropenylfuran, 2-vinyldibenzofuran, 2-methyl-5-vinylpyridine, 3-isopropenyl pyridine, 2-vinylpiperidine, 2-vinylquinoline, 2-vinyl- benzoxazole, 4-methyl-5-vinylthiazole, vinylthiophene, 2-isopropenyl thiophene, indene, courmarin, 1-chloroethyl vinyl sulfide, vinyl 2-ethoxyethyl sulfide, vinyl phenyl sulfide, vinyl 2-napthyl sulfide, allyl mercaptan, divinyl sulfoxide, vinyl phenyl sulfoxide, vinyl chlorophenyl sulfoxide, methyl vinyl sulfonate, vinyl sulfoanilide, and the like.

Interpolymerization can be carried out in a pressure resistant steel reactor employing any of the known and conventional emulsion polymerization procedures. In general, the reactor is charged with water, surfactant(s), a protective colloid such as polyvinyl alcohol, polymerization catalyst and buffer. If desired, the selected quantities of vinyl ester, ethylene, alpha, beta ethylenically unsaturated carboxylic acid, if any, and vinylcyclopropanedicarboxylate polyester oligomer can be sequentially or simultaneously introduced before and/or during the interpolymerization reaction and incrementally or all at once.

In general, ethylene is supplied continuously to the interpolymerization reaction by imposing a selected ethylene pressure within the reaction vessel, by means of an ethylene supply tank, and a compressor, if needed, and a pump.

The polymerization catalysts are normally peroxy compounds, which will provide free radicals for initiation of polymerization by thermal dissociation at a sufficiently high temperature or by redox reaction with a reducing agent at a relatively lower temperature.

In a preferred procedure, where redox initiation of polymerization is employed, about 10% of the total vinyl ester monomer is added initially and, with ethylene pressure imposed, the contents of the reactor are heated with stirring to the vicinity of the selected polymerization temperature.

Thereafter, the polymerization reaction is continued by gradually pumping into the reactor the remainder of the vinyl ester charge, containing dissolved therein the selected amounts of alpha, beta ethylenically unsaturated carboxylic acid, if any, and vinylcyclopropanedicarboxylate polyester oligomer, as well as, by an independent supply line, pumping in an aqueous solution of a reducing agent to maintain and regulate the rate of the redox initiation process. Generally, emulsion polymerizations of this type are continued until the selected amount of reducing agent solution has been added to the reactor and the ethylene pumping rate has fallen to zero or thereabouts, due to cessation of the interpolymerization process.

The surface active agents include any of the known and conventional surfactants and emulsifying agents, principally the nonionic and anionic materials, and mixtures thereof heretofore employed in the emulsion copolymerization of ethylenic monomers. Inclusive of suitable nonionic materials are the aliphatic, aromatic or alicyclic polyoxyalkylene glycols such as the Pluronics and Tetronics (BASF Wyandotte Corp.), the Igepals (GAF Corp. Chemical Products), the Tweens (ICI United States Inc.), the nonionic Tritons (Rohm & Haas Co.), and the Trycols (Emery Industries, Inc.), especially Trycol OP-407, a 70% active nonionic ethoxylated octylphenol having about forty ethyleneoxy units per molecule. Among the many anionic surface active agents which can be used herein are Emersal 6400 (Emery Industries, Inc.), a 30% active solution of sodium lauryl sulfate; Sipon ESY (Alcolac, Inc.), a 25% active solution of a sodium lauryl ether sulfate wherein the lauryl alcohol has been extended with about one ethyleneoxy unit per molecule; Emersal 6453, a 28% active solution of a sodium lauryl ether sulfate wherein the lauryl alcohol has been extended with about three ethyleneoxy units per molecule of these surfactants. Pluronic L-64, an ethyleneoxy-propyleneoxy block copolymer having a molecular weight of about 2900 is preferred.

In general, amounts of surface active agent of up to about 3 weight percent of the entire reaction medium, and in particular from 0.1 to about 1 weight percent, can be used with good results.

Protective colloids which can be optionally incorporated in the aqueous reaction media include the partially and fully hydrolyzed polyvinyl alcohols, which are preferred. Examples are the Gelvatols, which are 87–89% hydrolyzed polyvinyl alcohols which are produced by the Monsanto Co., and differ in molecular weight. According to the manufacturer, Gelvatol 20–30 has a viscosity of 4.7–5.4 cps and Gelvatol 20–60, 19–23 cps, all measured at 4% concentration in water at ambient temperature. Other protective colloids include polyvinylpyrrolidone, e.g., PVP-K30 polyvinylpyrrolidone produced by GAF Corporation; cellulose ethers, e.g., hydroxymethyl cellulose, hydroxyethyl cellulose, ethyl hydroxyethyl cellulose and ethoxylated starch derivatives; the natural and synthetic gums, e.g., gum tragacanth and gum arabic; polyacrylic acid and poly(methyl vinyl ether-co-maleic anhydride). The protective colloids can be employed in the usual amounts, e.g., from about 0.01 to about 5.0% by weight of the total charge.

The catalysts used in the interpolymerization reaction are selected from any of the known and conventional free radical polymerization catalysts heretofore used for the preparation of emulsion polymer latexes derived from ethylenic monomers and include inorganic peroxides such as hydrogen peroxide, sodium persulfate, potassium persulfate and ammonium persulfate and combinations of the aforesaid with reducing agents such as sodium hydrogen sulfite and sodium formaldehyde sulfoxylate. Catalyst (including co-catalyst reducing agent, if employed) is generally utilized at a level of from about 0.01 to about 1.0% by weight of the total charge.

An alkaline buffering agent such as sodium bicarbonate, ammonium bicarbonate, sodium acetate, and the like, may be added to the aqueous system to maintain the pH at the desired value. The amount of buffer is generally about 0.01 to 1.0% by weight, based on the total charge.

The temperature of the copolymerization reaction herein can be selected at levels which have heretofore been employed in emulsion polymerization processes. Accordingly, temperatures of from about 10° C. to about 95° C. can be used.

When a persulfate is reacted with a reducing agent to provide initiation of the interpolymerization, a polymerization temperature of about 30°–50° C. is preferred.

The pressure is generated by the particular mixture of monomers and water at the interpolymerization temperature of which the contribution of ethylene pressure is the greatest. Applied ethylene pressure can range from about 100 to 1,000 psi; an ethylene pressure of 300 to 600 psi is preferred.

EXAMPLE I

An interpolymerization of vinyl acetate with ethylene was carried out in a 5 gallon stainless steel reactor equipped with a mechanical stirrer, inlets for introducing ethylene and liquid additives, a thermocouple, a pressure gauge and a jacket through which water can be circulated. Temperature of the water leaving the jacket is recorded by a second thermocouple. Before entering the reactor jacket, the water passed through a coil immersed in a water bath that can be heated with steam. The thermocouples in the autoclave and in the jacket-water exit were connected to a Taylor Transcope recorder-controller (model 3) which can also turn the steam to the water bath on and off. With this arrangement, the reactor can be heated to polymerization temperature with warm water and, once polymerization started, its temperature controlled by circulating colder water to remove heat of polymerization. The interpolymerization procedure was as follows:

(1) In a separate container provided with an agitator, 200 gm of Gelvatol 20–30, 50 gm of Gelvatol 20–60, and 6.7 gm of sodium bicarbonate was suspended with agitation in 4250 gm of cold deionized water. The suspension was heated to 130°–140° F. and stirred until full dissolution of the polyvinyl alcohol was attained. Preferably the solution is filtered before being charged to the reactor.

(2) 5100 gm of vinyl acetate was charged to the monomer feed tank.

(3) The solution from (1), 15 gm of ammonium persulfate dissolved in 100 cc deionized water, 550 gm of vinyl acetate and 80 gm of Pluronic L-64 were charged to the reactor.

(4) The reactor was flushed with nitrogen for five minutes.

(5) The reactor was closed.

(6) The reactor was heated (120° F.) and pressurized with ethylene (460–480 psig). This pressure was kept constant throughout the run.

(7) A 0.2% aqueous solution of sodium formaldehyde sulfoxylate was charged to the catalyst feed tank.

(8) Approximately 50 cc of the sodium formaldehyde sulfoxylate solution was pumped to the reactor.

(9) Once it was noticed that the polymerization had started, the introduction of the main vinyl acetate charge was started and continued until the 5,100 g of additional vinyl acetate had been added.

(10) The monomer addition was completed in 165 minutes.

(11) Once the polymerization had started, the addition rate of the sodium formaldehyde sulfoxylate solution was set at approximately 120 cc/hr. Near the end, the addition rate was increased to approximately 150 cc/hr. A total of approximately 800 cc of the solution was used.

(12) Upon completion of the vinyl acetate addition, the polymerization continued for approximately 210 minutes.

(13) When the polymerization was almost completed as indicated by a jacket-water exit temperature which was only 2°–3° F. below the reaction temperature of 120° F., the reaction temperature was raised to a maximum of 160°–170° F.

(14) The ethylene pumping was shut off.

(15) The batch was held to a maximum temperature for about 30 minutes.

(16) The batch was cooled and was let down to atmospheric pressure. An interpolymer prepared by the foregoing procedure was found to contain 82 weight percent of combined vinyl acetate. Brookfield viscosities measured on the latex at room temperature (No. 3 Spindle) were 4,750 cps (2 rpm) and 1,800 cps (20 rpm).

EXAMPLE II

The copolymerization procedure of Example I was repeated except that 20 gm of 1-vinylcyclopropane-2,2-dicarboxylate polyester oligomer mixture prepared as described in Example I in copending Ser. No. 562,556 with 1,6-hexanediol employed as the diol, was added to the vinyl acetate monomer charged to the feed tank (step 2 of the procedure of Example I, herein). An interpolymer composition was recovered which contained 83.7 weight percent of combined vinyl acetate. The latex produced by the procedure of this example had room temperature Brookfield viscosities (Spindle No. 3) of 900 cps (2 rpm) and 570 cps (20 rpm).

EXAMPLE III

The copolymerization procedure of Example I was repeated, except as hereinafter noted for individual steps thereof:

(1) 140 gm of Gelvatol 20-30, 110 gm of Gelvatol 20-60 and 6.2 gm of sodium bicarbonate were suspended in 4230 gm of cold deionized water.

(2) 5100 gm of vinyl acetate, 40 gm of acrylic acid and 15 gm of 1-vinylcyclopropane-2,2-dicarboxylate polyester oligomer mixture disclosed in Example II was charged to the monomer feed tank.

(3) The solution from (1), 13 gm of ammonium persulfate dissolved in 100 cc deionized water, 550 gm of vinyl acetate and 140 gm of Pluronic L-64 were charged to the reactor.

(9) Once it was noticed that the polymerization had started, the introduction of the main vinyl acetate charge containing the 1-vinylcyclopropane-2,2-dicarboxylate polyester oligomer mixture of Example II and acrylic acid was started and continued until completing the addition.

(10) The addition was completed in 175 minutes.

(12) Upon completion of the addition, the polymerization was continued for approximately 170 minutes. An interpolymer composition was recovered which contained 84.7 weight percent of combined vinyl acetate. The latex produced by the procedure of this example had room temperature Brookfield viscosities (Spindle No. 3) of 1750 cps (2 rpm) and 975 cps (20 rpm).

Test Procedure

For purposes of comparison, the copolymer control latex of Example I, the interpolymer latexes of Example II and Example III, and a specimen of Airflex 400, employed hereinafter as a standard latex, were subjected, uncompounded, to three performance tests. The tests were a creep test, a time of set test and a water sensitivity test. Details of these tests are as follows:

A. Creep Test

A sheet of 10 inch × 15 inch No. 40 Kraft paper was secured on a smooth, clean, flat surface. A film of 0.003 inch thickness and 7.5 inch width was cast from the latex to be tested onto the paper allowing a 1.5 inch to 2.5 inch border on one side. Immediately thereafter, the coated sheet was covered with a second identical sheet of Kraft paper and uniform contact was assured by passing a roller 2 to 3 times over the sandwiched film. After a 24-hour conditioning period, 2 transverse strips were cut from the paper sandwich. The free tabs were carefully separated and the adhesive line was marked. One tab of each of the two strips was attached to the upper surface of an oven chamber held at a constant temperature of 140° F. and from each of the second tabs a 200 gm weight was suspended in such a way that stress was maintained on the adhesive joint. The test specimens were maintained in the oven for 24 hours at 140° F. after which the amount of creep was measured and recorded (see below). The same creep test was performed on Airflex 400.

B. Time of Set Test

A sheet of 10 inch × 15 inch No. 40 Kraft paper was secured on a smooth, clean, flat surface. Approximately 5 gm of a standard commercial latex (Airflex 400) and the same quantity of one of the latexes which is to be compared with the standard latex were deposited approximately 3 inches from the upper end of the Kraft paper, sufficient distance being maintained between the samples so that they did not intermingle. A side-by-side film is then cast on the Kraft paper using a draw-down bar. After 10 seconds, an identical sheet of Kraft paper was placed over the cast film. To insure uniform contact, a roller was run over the paper sheets 2 to 3 times. After 15 seconds, the upper sheet was grasped at the top two corners and slowly and evenly pulled away from the bottom fixed sheet, during which the degree of difference in paper tearing was observed. If, compared to the adhesive layer from the standard latex, the layer from the latex being compared pulls paper fibers before that of the standard latex, it was considered superior to the latter, if it pulled paper fibers at the same time, it was considered equal thereto, and if after the standard, it was considered inferior thereto.

C. Water Sensitivity Test

A film of the standard latex and a film of the latex to be compared were cast side-by-side on a glass plate with a 6 inch wide, 0.007 inch draw-down bar, care being taken not to intermingle films. After a 24-hour conditioning period, an inch wide circle of water was placed on each film. After one minute, using a constant back and forth finger motion, both films were rubbed to an equal extent until they were lifted from the glass plate. It was noted whether the latex being compared was more adherent (superior), equal in adherence, or less adherent (inferior) than the standard latex film.

The results of the aforesaid performance tests are tabulated below:

| Test Results Relative to Airflex 400 Standard | | | |
|---|---|---|---|
| Latex of: | Creep Tests 140° F., mm | Time of Set | Water Sensitivity |
| Airflex 400 | 0; 2 | Standard | Standard |
| Example I | 20; 21 | Superior | Superior |
| Example II | 0; 1 | Equal | Equal |
| Example III | 0; 2 | Equal | — |

From these comparative tests, it is clear that the interpolymer latexes produced from vinyl acetate, ethylene and 1-vinylcyclopropane-2,2-dicarboxylate polyester oligomers, wherein the diol was employed was 1,6-hexanediol, compare favorably with the commercial latex Airflex 400 in resistance to creep, time of set and water sensitivity.

What is claimed is:

1. An interpolymer derived from the interpolymerization of
   (a) a vinyl ester;
   (b) a lower alpha olefin; and
   (c) a vinylcyclopropanedicarboxylate polyester oligomer or mixture thereof of the formula:

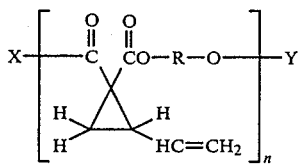

wherein R is a bivalent radical derived from a $C_{2-12}$ aliphatic diol, $C_{3-12}$ cycloaliphatic diol, $C_{8-10}$ aromatic diol or ether diol having from about 4 to about 60 carbon atoms and about 1 to about 30 ether moieties, n is an integer from about 1 to about 20 and X and Y are terminating groups.

2. The interpolymer of claim 1 which further comprises (d) an alpha, beta ethylenically unsaturated carboxylic acid.

3. The interpolymer of claim 1 wherein the vinyl ester is vinyl acetate.

4. The interpolymer of claim 2 wherein the alpha, beta ethylenically unsaturated carboxylic acid is acrylic acid or methacrylic acid.

5. The interpolymer of claim 1 wherein the lower alpha-olefin is ethylene.

6. The interpolymer of claim 1 wherein, in the vinylcyclopropanedicarboxylate polyester oligomer, X is hydroxy, alkoxy or the group -OROH, where R is a bivalent radical derived from a $C_{2-12}$ aliphatic diol, $C_{3-12}$ cycloaliphatic diol, $C_{8-20}$ aromatic diol or ether diol having 4 to 60 carbon atoms and 1 to about 30 ether moieties and Y is hydrogen or the radical

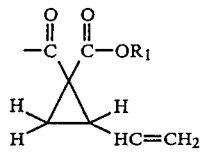

where $R_1$ is hydrogen or a $C_{1-14}$ alkyl group.

7. The interpolymer of claim 1 wherein the vinylcyclopropanedicarboxylate polyester oligomer is a mixture of oligomers, the major part by weight of said mixture being made up of oligomers in which n is 1 to about 8.

8. The interpolymer of claim 7 wherein in the vinylcyclopropanedicarboxylate polyester oligomer or mixture thereof, X is hydroxy, alkoxy or the group —OROH where R is a bivalent radical derived from $C_{2-12}$ aliphatic diol, $C_{3-12}$ cycloaliphatic diol, $C_{8-20}$ aromatic diol or ether diol having from about 4 to about 60 carbon atoms and about 1 to about 30 ether moieties and Y is hydrogen or the radical

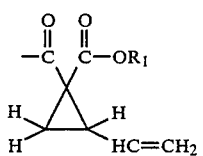

where $R_1$ is hydrogen or a $C_{1-4}$ alkyl group.

9. The interpolymer of claim 8 wherein the vinylcycylopropanedicarboxylate polyester oligomer or mixture thereof has an average molecular weight from about 200 to about 15,000 and a 24° C. viscosity of about 0.2 to about 200 poise.

10. The interpolymer of claim 9 wherein the average molecular weight of the vinylcyclopropanedicarboxylate polyester oligomer or mixture thereof is about 300 to about 6,000 and the viscosity is about 0.3 to about 150 poise.

11. The interpolymer of claim 1 wherein the vinylcyclopropanedicarboxylate polyester oligomer or mixture thereof is obtained by the reaction of 1-vinylcyclopropane2,2-dicarboxylic acid or $C_{1-4}$ alkyl ester thereof with a diol selected from the group consisting of $C_{2-12}$ aliphatic diol, $C_{3-12}$ cycloaliphatic diol, $C_{8-20}$ aromatic diol or ether diol having from 4 to about 60 carbon atoms and 1 to about 30 ether moieties, the respective reactants present in an equivalents ratio from about 2:1 to about 1:2.

12. The interpolymer of claim 11 wherein the equivalents ratio of the reactants is from about 1.3:1 to about 1:1.3.

13. The interpolymer of claim 1 wherein the vinyl ester is present from about 40 to about 95 weight percent of the total charge.

14. The interpolymer of claim 1 wherein lower alpha olefin is present from about 5 to about 60 weight percent of the total charge.

15. The interpolymer of claim 2 wherein the alpha, beta ethylenically unsaturated carboxylic acid is present from about 0.5 to about 5.0 weight percent of the total charge.

16. The interpolymer of claim 1 wherein the vinylcyclopropanedicarboxylate polyester oligomer is present from about 0.1 to about 1.0 weight percent of the total charge.

17. A latex containing the interpolymer of claim 1.

18. A latex containing the interpolymer of claim 2.

19. A latex adhesive composition of improved creep resistance, containing an interpolymer of claim 1.

20. A latex adhesive composition of improved creep resistance containing an interpolymer of claim 2.

21. A process for preparing an interpolymer latex which possesses at least about 60 weight percent of combined vinyl acetate from:
 (a) vinyl ester in an amount representing from about 40 weight percent to about 95 weight percent of the total charge;
 (b) a lower alpha olefin representing from about 5 to about 60 weight percent of the total charge; and
 (c) vinylcyclopropanedicarboxylate polyester oligomer or mixture thereof of the formula:

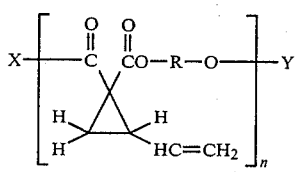

representing from about 0.1 to about 1.0 weight percent of the total charge which comprises polymerizing in a single reaction stage at least 10 weight percent of the total vinyl ester monomer (a) under an ethylene pressure of about 100 to about 1,000 psi in an aqueous emulsion reaction medium containing a polymerization catalyst, and thereafter polymerizing in said reaction, the remaining portion of the total vinyl ester monomer (a) together with the lower alpha olefin (b) and the vinylcyclopropanedicarboxylate polyester oligomer (c) in the reaction medium containing additional catalyst, if needed, polymerization being continued substantially to completion.

22. The process of claim 21 which further comprises the addition of (d) an alpha, beta ethylenically unsaturated carboxylic acid in an amount of from about 0.5 to about 5.0 weight percent of the total, charge.

23. The process of claim 21 wherein the lower alpha-olefin is ethylene.

24. The process of claim 21 in which one or more other ethylenically unsaturated monomers copolymerizable with the vinyl ester (a), the ethylenically unsaturated monomer (b), the vinylcyclopropanedicarboxylate polyester oligomer or mixtures thereof (c), and the alpha, beta ethylenically unsaturated carboxylic acid (d), present in an amount of up to about 10 weight percent of the total charge is added at the commencement of, or during, polymerization.

25. The process of claim 21 in which less than about 60 weight percent of total vinyl ester monomer present is initially added to the rection medium with the balance thereof being sequentially added to the reaction medium with monomer (b), vinylcyclopropanedicarboxylate polyester oligomer or mixtures thereof (c) and the alpha, beta ethylenically unsaturated carboxylic acid.

26. The process of claim 21 in which the reaction medium additionally contains at least one surface active agent selected from the group consisting of nonionic surface active agents, anionic surface active agents, and mixtures thereof.

27. The process of claim 21 in which the reaction medium additionally contains a protective colloid.

28. The process of claim 21 wherein which the reaction medium additonally contains an alkaline buffering agent.

29. The process of claim 21 wherein the vinyl ester (a), the ethylenically unsaturated monomer (b) and the vinylcyclopropanedicarboxylate polyester oligomer (c) can be introduced sequentially or simultaneously before or during the interpolymerization reaction.

30. The interpolymer latex prepared by the process of claim 21.

31. The interpolymer latex prepared by the process of claim 22.

32. An adhesive composition of improved creep resistance containing an interpolymer latex prepared by the process of claim 21.

33. The process of claim 21 wherein the ethylene pressure is about 300 to about 600 psi.

34. The process of claim 25 wherein the surface active agent is present up to about 3 weight percent of the total charge.

35. The process of claim 26 wherein the surface active agent is present from about 0.1 to about 1.0 weight percent of the total charge.

36. The process of claim 21 wherein the polymerization temperature is about 10° to about 95° C.

37. The process of claim 25 wherein the buffer is present from about 0.01 to about 1.0 weight percent of the total charge.

38. The process of claim 21 in which the reaction medium additionally contains a protective colloid in an amount from about 0.01 to about 5.0% by weight of the total charge.

* * * * *